US006755312B2

United States Patent
Dziedzic

(12) United States Patent
(10) Patent No.: US 6,755,312 B2
(45) Date of Patent: Jun. 29, 2004

(54) BAND TYPE CLUSTER MOUNT

(75) Inventor: Edward Dziedzic, Memphis, TN (US)

(73) Assignee: Alum-Form, Inc., Memphis, TN (US)

( * ) Notice: Subject to any disclaimer, the term of this patent is extended or adjusted under 35 U.S.C. 154(b) by 0 days.

(21) Appl. No.: 10/021,113

(22) Filed: Dec. 12, 2001

(65) Prior Publication Data

US 2003/0066812 A1 Apr. 10, 2003

Related U.S. Application Data

(60) Provisional application No. 60/254,795, filed on Dec. 13, 2000.

(51) Int. Cl.[7] .................................................. A47F 5/08
(52) U.S. Cl. ...................... 211/107; 248/230.1; 211/175
(58) Field of Search ................................ 211/107, 175, 211/196, 205, 183, 26; 248/221.11, 221.12, 219.4, 218.4, 230.1, 230.7, 230.8, 230.9, 231.71, 231.81, 230.5, 230.6

(56) References Cited

U.S. PATENT DOCUMENTS

| 2,703,216 A | * | 3/1955 | Petersen .................. 248/230.9 |
| 2,883,135 A | * | 4/1959 | Smalley ................... 248/230.5 |
| 2,990,151 A | * | 6/1961 | Phillips ....................... 211/107 |
| 3,374,978 A | | 3/1968 | Salmon et al. |
| 3,497,171 A | * | 2/1970 | Farmer et al. ......... 248/226.12 |
| 3,734,438 A | * | 5/1973 | Kautz .......................... 211/107 |
| 3,856,250 A | | 12/1974 | Farmer |
| 4,103,853 A | * | 8/1978 | Bannan .................... 248/219.1 |
| 4,781,348 A | * | 11/1988 | Cutforth et al. ......... 248/218.4 |
| 4,896,856 A | | 1/1990 | Farmer et al. |
| 4,903,927 A | | 2/1990 | Farmer |
| 5,193,774 A | * | 3/1993 | Rogers .................... 248/219.4 |
| 5,275,368 A | * | 1/1994 | Hall et al. ............... 248/218.4 |
| 5,988,727 A | * | 11/1999 | Mueller .................... 296/78.1 |

FOREIGN PATENT DOCUMENTS

CA          67938        2/1991

* cited by examiner

Primary Examiner—Jennifer E. Novosad
(74) Attorney, Agent, or Firm—Paul M. Denk

(57) ABSTRACT

A cluster mount, formed of a bearing plate, a bracket that engages with the bearing plate by means of fasteners, and resilient retention clips that are permanently secured to the cluster mount at positions for snugly retaining associated connecting links in place once the cluster mount components are assembled, to provide a cluster mount of a required circumferential dimension to be accommodated upon utility poles of varying sizes, after adjustment of the cluster mount components together during assembly. Connecting links are disposed for inserting through shaped slots furnished in the flanges of the bearing plate that provide adequate clearance for adjustment of each connecting link when assembled into the cluster mount.

6 Claims, 2 Drawing Sheets

BAND TYPE CLUSTER MOUNT

This application claims priority from U.S. provisional application serial No. 60/254,795, filed Dec. 13, 2000.

BACKGROUND OF THE INVENTION

Various styles of cluster mounts have been available for the installation and supporting of electrical instrumentation upon utility poles, whether it be transformers, or other electrical instrumentation. Generally, these various styles of cluster mounts have been fabricated of lightweight aluminum, but due to their unique designs, and interengagement, for their mounting high upon the pole, they yet sustain sufficient strength to hold very heavy objects, such as transformers, permanently in place, and over a lengthy period of time.

Examples of the type of cluster mounts can be seen in various patents held by the assignee of this current application, and for example, one such transformer mounting device is disclosed in the U.S. Pat. No. 3,374,978. In addition, an electrical equipment cluster mount is shown in the U.S. Pat. No. 4,903,927. In addition, the interegaged component electrical equipment shown in the U.S. Pat. No. 3,856,250, has likewise been designed of interconnected components, that mount directly to the utility pole, and for the attachment and support of various electrical devices. In addition, the U.S. Pat. No. 4,896,856, shows an electrical equipment cluster mount, having various shaped components, that are interconnected together, and in this particular instance, for supporting three heavy transformers high up upon the utility pole, rather stably in place.

In the U.S. Pat. No. 3,374,978, upon the transformer mounting device and method, it can be seen that these types of cluster mounts not only can be configured for interconnection of their various components together, but they even attain some adjustability, for size requirements, which when assembled, included a variety of connecting links, as can be seen, which incorporate integral hook portions, that provide for the fabrication of their transformer supporting components into various circumferences, so that the cluster mounting device can be preassembled, on the ground, to the approximate desired size, and then raised up on the pole for securement through tightening of its threaded fastener and bolt, as can be noted.

These types of mounting devices, of the cluster mounting configuration, have worked very well for the assignee, and its utility customers, over the years. One of the elements has been helpful in the stability of this device, and that is the application of a spring clip at the vicinity where the hook connecting links secure through the corresponding slots of the associated bearing plates, when the cluster mounts are assembled. These clips slide into the remaining space provided through the slots, adjacent the connecting links, to assure that they remain interconnected, during assembly, conveyance, and when installed. Spring clips of these types can be seen in the Canadian patent No. 67938.

One of the minor drawbacks of these various earlier cluster mounts has been in the design of the cluster in the vicinity where the connecting links secure through the bearing plate slots, and are held therein by means of a spring clip, since on occasion the spring clips are jarred free or become loose, which can cause a band failure, when the bands are overstressed while not fully engaged in their installed engaged positions. The current invention provides further modifications and improvements to such cluster mounts, so as to assure that the mounts retain their integrity once assembled and installed, any function fully effectively for holding such heavy electrical instruments high upon utility poles for the duration of their usage, which may be for extended periods.

SUMMARY OF THE INVENTION

This invention relates generally to improvements to configured band type of cluster mounts, for use in holding various styles of electrical instruments, including transformers, up upon a utility pole.

This invention contemplates the adaptation of various changes to electrical equipment cluster mounts that make the mounts function more effectively for sustained periods of time, and prevent untimely disconnection of its various assembled components, or their dislodgment from upon the utility pole once installed, but at the same time allows for very quick adjustment simply through elementary manual manipulations of its interconnecting components, to furnish size adjustments or further modifications to the cluster mount once assembled. These changes in design include the use of a particularly designed and shaped retention spring, that when in its steady state configuration and form, continuously biases the various extruded components fabricated into the cluster mount, into a tightly interconnected relationship, without further effort. At the same time, such mounting clips can be instantaneously freed from the biasing force against the mount components to allow the components to be readjusted into their perimeter configuration, designed for encircling the type of utility pole upon which the cluster mount is intended to be secured. All that need be done is to simply pull back on the retention clip, against its inherent resiliency, to remove it from its force exerting position upon the cluster mount components during adjustment. Furthermore, the slots within the bearing plates and through which the connecting links locate, are designed of a specific angular configuration to provide just enough adequate clearance for the connecting links to be adjusted between their various integral hooks, when embracing the bearing plate, as when the cluster mount is adjusted into a particular circumferential configuration. This not only allows for the connecting links to be adjusted, but also furnishes just enough clearance so as to prevent the untimely dislodgment of the connecting links when adjusted into a particular dimensional pattern as the cluster mount is being assembled for installation to the utility pole. The interface design contours between these formed slots, and the connecting links, allows adequate clearance for the bands to rotate freely while maintaining full bearing contact with the utility pole, but yet, does not provide so much clearance that the components will freely disengage once assembled. These features, in combination with the newly designed retention clip, add desirably to the functionality of the cluster mounts, when assembled and when installed by an individual utility man, upon the supporting pole.

More specifically, the slots provided through the outwardly extending flanges of each bearing plate are angularly oriented, for the purpose of providing just enough clearance to facilitate the shifting of the connecting links to enable engorgement between the bearing plates and various connecting link hooks, depending upon the circumferential size of the cluster mount required, which is dictated by the diameter of the pole upon which it is to be secured.

In addition, the retention clip of this invention is designed for more permanent installation than those previously used in the prior art, and therefore, cannot fall or break free from its retention, once installed. In addition, the clips, due to their peculiar shape, and their fabrication from resilient material, such as metal, or perhaps even a plastic, constantly bias against the connecting links to keep them into engagement with their associated bearing plates, but at the same time, can be easily shifted to furnish clearance for movement of the connecting links into a tighter configuration, or extended for expanding the circumferential size of the cluster mount during assembly.

It is, therefore, the principal object of this invention to provide a cluster mount that may be more facilely assembled, adjusted, and installed by a single worker, upon a utility pole.

Another object of this invention is to provide a regulation of the dimensions of the various components for the cluster mount of this invention, so that they may be easily adjusted and have adequate clearance to facilitate their shifting when differing sized cluster mounts may be required for installation.

Still another object of this invention is to provide a retention clip that is a more permanent installation, and therefore cannot break free or fall from the assembled cluster mount, while the worker takes it up upon the utility pole for installation.

Another object of this invention is to provide a retention clip that may be easily manipulated, single handily by the installing worker, to provide for varying adjustments to the cluster mount, even when the worker is high up upon the utility pole.

These and other objects may become more apparent to those skilled in the art upon review of the summary of this invention, and upon undertaking a study of the description of its preferred embodiment, in view of the drawings.

BRIEF DESCRIPTION OF THE DRAWINGS

In referring to the drawings, FIG. 1 provides a top view of the cluster mount of this invention, when fully assembled, and installed upon a utility pole, to its lesser dimensional size.

DESCRIPTION OF THE PREFERRED EMBODIMENT

Figure 1:
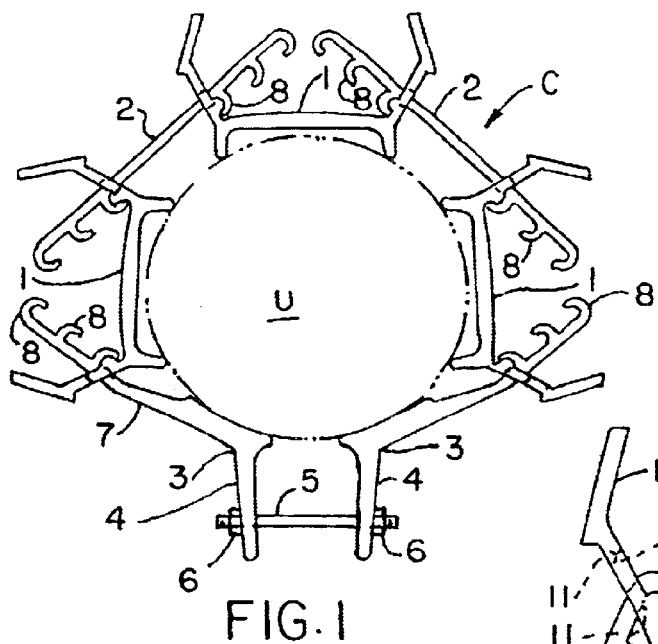
Figure 2:
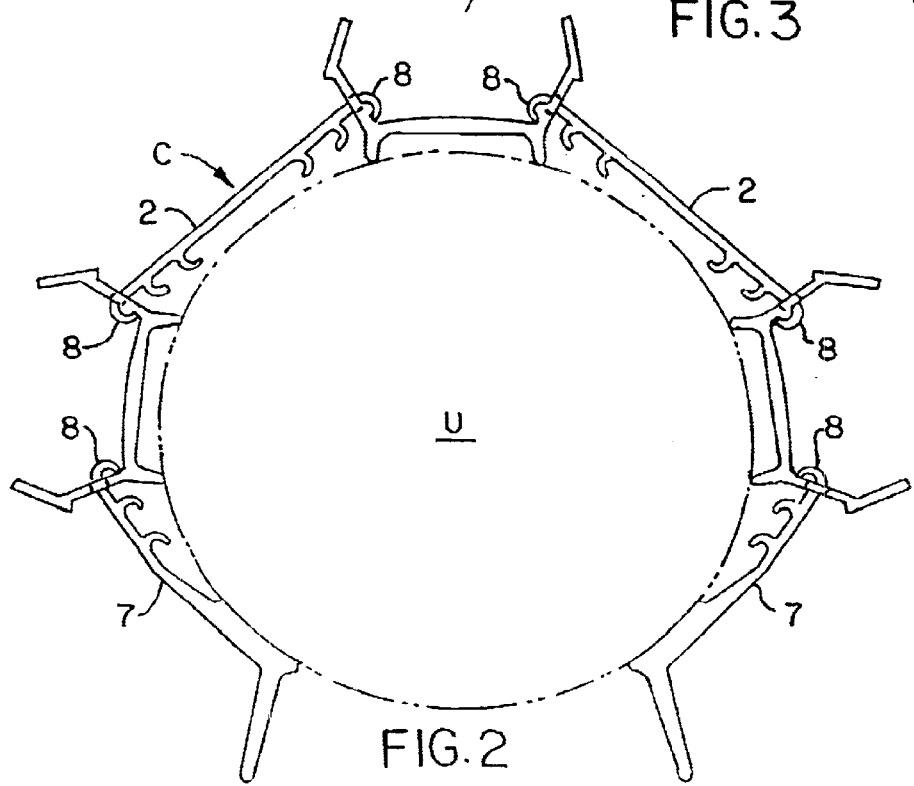
FIG. 2 discloses the same cluster mount but adjusted into its fullest diameter, for installation upon a larger type utility pole.

The cluster mount of this invention can be readily seen in FIGS. 1 and 2 of the drawings. As noted, the cluster mount C is formed of a series of bearing plates or pole gains 1, which bias against the utility pole U, when assembled and mounted, and are held into position by means of the connecting links 2, in addition to the adjusting plates and integral links 3, as noted. The adjusting flanges 4 are secured together and tightened by means of the fastening rod 5 when the cluster mount C is assembled, adjusted, and raised up upon the utility pole for installation. It is the tightening of the rod 5, by means of its associated nuts 6, that are used to tightly fasten the cluster mount about the pole when installed. Each of the connecting links 2, in addition to the link portions 7, of the retention flanges and connecting links 3, include a series of adjustment hooks, as at 8, so that the circumferential dimension of the cluster mount, in preparation for installation, can be properly determined and prepared for fitting tightly upon the utility pole U, upon which it is to mount. For example, as can be seen in FIG. 1, all of the connecting links are secured by means of their innermost hooks 8, to the flanges of the bearing plates 1, so as to provide a lesser diametrical distance in the size of the assembled cluster mount, in preparation for installation upon a smaller diameter utility pole U. On the other hand, as can be seen in FIG. 2, each of the connecting links 2 and link portions 7 are connected by means of their integral hooks furnished at the outermost edges of these links, in order to provide for a wider diametered assembled cluster mount, for installation upon a utility pole U1 of greater diameter, as can be noted.

One of the attributes of this invention is that the slots, as at 9, formed within the flanges 10 of each of the bearing plates 1, are formed of a particular configuration, and generally cut through the flanges along a bevel, as at 11, and which beveled slot, in each flange, is dimensioned to provide adequate clearance, but only slightly, to the various hooks 8 of the associated connecting link 2, or link portion 7, with the bevels 11 of each formed slot being somewhat aligned with the positioning of the associated connecting link therethrough, to add that clearance necessary for adjustably setting the connecting link 2 and link portion 7 relative to their associated bearing plates 1, when the cluster mount is assembled into a particular circumferential configuration, to obtain that size necessary to provide mounting of the cluster mount upon the respective utility pole.

Figure 3:
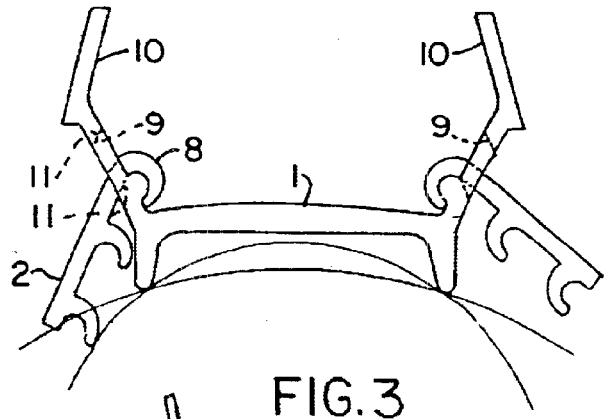
FIG. 3 discloses a segment of the connecting links, as extending through the flanges of a bearing plate, and showing the angulated clearance that is provided that furnishes sufficient space for adjustable manipulation of the connecting links, when the cluster mount is being assembled, or varied circumferential size, even when the worker is up upon the utility pole.

Obviously, the slots 9 are formed integrally within each of the flanges 10 of the associated bearing plates 1, and do not open externally, so that once a connecting link is slid therein, and therethrough, it is embraced by the flange, with the hook 8 of each connecting link then securing inwardly of each of the bearing plate flanges 10, as can be specifically seen in FIG. 3.

Figure 4:
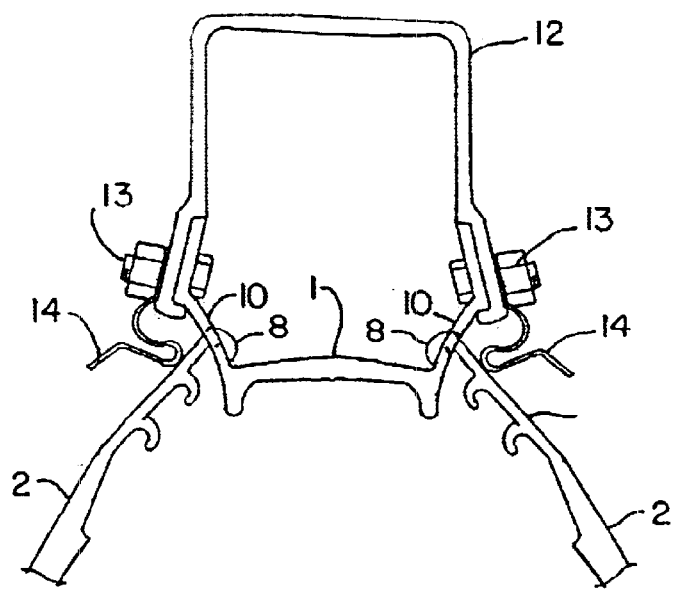
FIG. 4 shows a pair of connecting links, connecting with the flanges of a bearing plate, and having the mounting surface of the U-shaped brackets attached thereto, by means of the shown bolts, while further permanently securing the retention clips thereto, during their application and usage.
Figure 5:
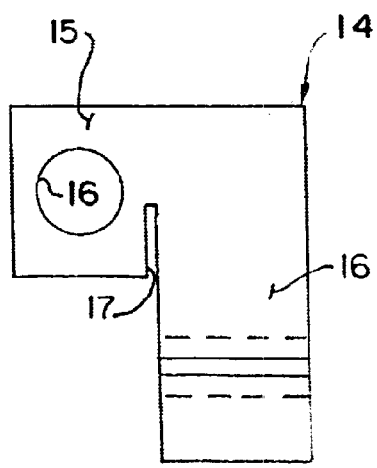
FIG. 5 is a front view of one of the retention clips of this invention.
Figure 6:
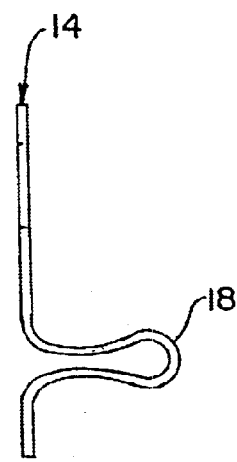
FIG. 6 is a side view thereof.

FIG. 4 discloses the assembly of one part or component of the cluster mount, wherein a connecting link 2 or link portion 7 is secured through the associated slots of the disclosed bearing plate 1, the flanges 10 of the bearing plate are configured and disposed for reception and connection with the transformer mounting brackets 12, as shown and known. These components are held into a tight interengaged and mated relationship by means of the bolts and nuts 13, as disclosed.

Figure 7:
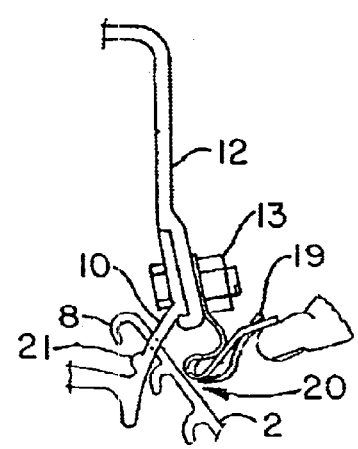
FIG. 7 discloses one of the retention clips being compressed into the position of disengagement with its normally associated connecting link, to allow for adjustment of the connecting link relative to the flanges of the bearing plate, when changing the size of the assembled cluster mount.

As previously reviewed, the type of spring clip as shown in Canadian patent No. 67938, as previously referred to, would then engage within the remaining clearance of the slot, against the outer surface of the connecting link 2 or link portion 7, in order to provide for retention of the components together, and not allow a connecting link to become free from its connection with the bearing plate 1 after assembly of the cluster mount, especially while it is being elevated upon the utility pole for installation. With this invention, a specially designed retention clip 14, can be seen in FIGS. 4 through 7. These clips are designed to have a base portion 15, which contains an aperture 16 therethrough, and this aperture is designed for accommodating the bolt 13, therethrough, and being rigidly tightened at this location when the fastener 13 secures the associated components of the bracket 12, and the flanges 10 of the bearing plate 1, together, as can be noted. The retention clip integrally includes an extending segment 16, integrally formed with the base 15, but includes a clearance slot 17, for purposes to be subsequently described. The retention spring clip also includes an integrally and outwardly flared portion 18, which functions as a spring, to add resiliency to the overall clip, particularly during application. As noted in FIG. 4, the retention clip 14 is in its static position, being configured to bias tightly upon the contiguous part of the connecting link 2, and therefore, once the hook 8 engages the associated bearing plate 1, the spring will retain these components tightly engaged, and not allow any of the connecting links 2 or link portions 7 to become freed. On the other hand, as can be seen in FIG. 7, when the extending tab 19 of the retention spring clip 14 is pulled away from the associated connecting link, to furnish clearance as at 20 away from the connecting link 2, the connecting link is then free to be shifted within its companion slot 9, within the flange 10, when adjustment is required to either increase or decrease the size of the cluster mount, depending upon the dimensions of the utility pole upon which the mount is to be installed. Thus, variation of pole sizes can be accommodated by the improvements to the cluster mount as described herein, and the cluster mount can be adjusted to more readily accommodate the size of the pole upon which it is to secure upon. Thus, since variation of pole sizes may cause excess stress in the band connections when they are arranged to accommodate smaller or larger poles for mounting, full bearing engagement can be obtained, and sustained, for the installed cluster mount. The retention spring clip assures that the various components of the cluster mount are fully engaged, and as a result, the number of band failures that would otherwise occur, due to their overstressing because their components are not fully engaged, can be obviated.

As previously reviewed, the type of spring clip as shown in the Canadian patent may have a propensity to either be lost, or fall out of engagement, due to the fact that the spring is a separate part of the cluster mount, and requires a separate emplacement by the installer during installation of the mount. With this current improved invention, the retention spring clip becomes a permanent part of the assembled cluster mount.

Sharp contours that are used with original pole gains and bands have a tendency to create problems in quality control of dimensions for the cluster mount, and the metal strength quality experience, since these shapes are designed and fabricated necessarily as aluminum extrusions. The current invention addresses all of these problems, and improves upon functionality of the banded cluster mount, by changing the interface design contours of the mount, as assembled, to use/incorporate an angular type of slot within the bearing plates to furnish adequate clearance for the connecting links, so that they may shift freely while maintaining full bearing contact with the pole gain in which they insert. Furthermore, redesigning of the spring clip in the manner as disclosed herein, and its method of permanent attachment, eliminates any need for the installer to have to handle a separate part, as was done with previous designs. This assures a permanent and positive engagement, of the various components of the cluster mount, without any necessity for further intervention or adjustment, once assembled.

In addition, it can be noted that there is a mating engagement between the boss 21 and the shape of the associated hook 8 of the connecting link 2, so that once the connecting link is installed at the proper dimension, its hook can engage upon and be retained to the boss 21, as can be understood.

Another advantage of the improved design for this cluster mount, is that its various bearing plates 1, the brackets 12, and their fastening together by means of the bolts and nuts 13, can be preassembled in the factory, with the retention spring clip applied to these modular components at this location, before the components are ever taken out to the site for usage. Hence, this reduces the potential for losing parts of the cluster mount, once the installer or worker arrives out at the field, to install a cluster mount in place. In other words, if there are weeds or other vegetation growing around the base of the utility pole, previously there was always the possibility that the earlier style of spring clip could be dropped, and lost, to the dismay of the workmen. This is eliminated by the current improved design.

Variations or modifications to the subject matter of this invention may occur to those skilled in the art upon reviewing the disclosure as provided herein. Such variations, if within the scope of this development, are intended to be encompassed by the improved invention and claims as described herein. The depiction of the preferred embodiment in the drawings, and as described in this specification, is primarily set forth for illustrative purposes only.

What is claimed is:

1. A band type cluster mount for use upon a utility pole comprising:
    adjusting plates adapted to be mounted to the utility pole, each said adjusting plate having a mounting means along one side and being adjustably connected to one another by a fastener, said fastener capable of adjustably tightening said adjusting plates together;
    bearing plates for supporting electrical equipment such as transformers connected to the adjusting plates by being structurally interlocked with said adjusting plate mounting means, said bearing plates each having slots therein to accommodate the adjusting plate mounting means;
    a series of resilient retention clips attached to the cluster mount, each said retention clip being biased between an adjusting plate and a bearing plate and having a readily accessible free end and a biased end, the biased end being engaged with one of said adjusting plate and bearing plate and capable of disengagement by applying pressure to the free end;
    wherein the bias of each retention clip applies a force through said biased end against its respective adjusting plate, said force being directed to keep the adjusting plate mounting means structurally interlocked with the bearing plate during assembly, installation and use of the cluster mount.

2. The cluster mount of claim 1, wherein the bearing plate slots are so configured and so sized as to accept in an interlocking manner the ready insertion of the adjusting plate mounting means, said bearing plate at the slots being beveled to minimize the clearance between said mounting means and the slot, so as to minimize the potential for the adjusting plate mounting means and the bearing plate to disengage during assembly, installation or use of the cluster mount.

3. The cluster mount of claim 1, wherein there are a plurality of bearing plates and a plurality of connecting links, each said connecting link having a mounting means at each end, wherein each said bearing plate is connected to a connecting link by structurally interlocking with said connecting links mounting means in predetermined spaced relationship to one another.

4. The cluster mount of claim 3 wherein the adjusting plate mounting means comprise a series of spaced hooks, each said hook capable of engagement with said bearing plates, therein providing adjustability to the separation between the adjusting plates and the bearing plates when engaged with one another.

5. The cluster mount of claim 3 wherein the connecting link mounting means comprise a series of spaced adjustment hooks, each said hook capable of engagement with said bearing plates, therein providing adjustability to the separation between the connecting links and the bearing plates when engaged with one another.

6. A band type cluster mount for use upon a utility pole comprising:

one or more pairs of adjustable plates adapted to be mounted to the utility pole, the individual adjusting plates within each said pair being adjustably connected to one another by a fastener;

bearing plates adapted to be mounted to the utility pole, each said bearing plate capable of supporting electrical equipment such as transformers; and connecting links; wherein said bearing plates, connecting links and said pairs of adjusting plates are structurally interlocked with one another in the approximate shape of a ring capable of encircling and being tightened onto the utility pole, and a series of resilient retention clips, said clips being attached to the cluster mount, each said retention clip being biased between a combination of any two of said adjusting plates and bearing plates, and associated connecting link, and having a readily accessible free end and a biased end, the biased end being engaged with said combination and capable of disengagement by applying pressure to the free end of said retention clip, wherein the bias of each retention clip applies a force through said biased end and directed to keep the members of said combination structurally interlocked with one another during assembly, installation and usage of the cluster mount.

* * * * *